(12) United States Patent
Constable et al.

(10) Patent No.: US 9,152,476 B2
(45) Date of Patent: *Oct. 6, 2015

(54) INTERFACE FOR DISPLAYING CONTENT SUPPORTING HARDWARE ACCELERATION

(71) Applicant: Microsoft Corporation, Redmond, WA (US)

(72) Inventors: Benjamin C. Constable, Redmond, WA (US); Cenk Ergan, Bellevue, WA (US); Christian Fortini, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/835,423

(22) Filed: Mar. 15, 2013

(65) Prior Publication Data

US 2013/0205308 A1      Aug. 8, 2013

Related U.S. Application Data

(63) Continuation of application No. 13/031,954, filed on Feb. 22, 2011, now Pat. No. 8,424,025.

(51) Int. Cl.
*G06F 3/00*      (2006.01)
*G06F 9/54*      (2006.01)

(52) U.S. Cl.
CPC . *G06F 9/54* (2013.01); *G06F 9/541* (2013.01)

(58) Field of Classification Search
CPC ....................................... G06F 9/541
USPC ....................................... 719/328
See application file for complete search history.

(56) References Cited

U.S. PATENT DOCUMENTS

| 5,339,392 | A  | * | 8/1994  | Risberg et al. ........... 715/762 |
| 6,480,201 | B1 | * | 11/2002 | Fushiki et al. ........... 345/592 |
| 6,735,773 | B1 |   | 5/2004  | Trinh et al. |
| 6,965,955 | B1 | * | 11/2005 | Nishiyama .............. 710/72 |
| 7,031,348 | B1 |   | 4/2006  | Gazit |
| 7,487,214 | B2 | * | 2/2009  | Qureshi et al. ........... 709/206 |
| 8,001,531 | B1 | * | 8/2011  | Rideout et al. ........... 717/124 |
| 8,032,482 | B2 |   | 10/2011 | Rosenberg et al. |
| 8,424,025 | B2 |   | 4/2013  | Constable et al. |

(Continued)

OTHER PUBLICATIONS

Yuanbin Guo, Compact Hardware accelerator for Functional Verification and Rapid Prototyping of 4 G Wireless Communiction Systems, 2004.*

(Continued)

*Primary Examiner* — Lechi Truong
(74) *Attorney, Agent, or Firm* — John Jardine; Kate Drakos; Micky Minhas

(57) ABSTRACT

One or more application programming interfaces (APIs) are exposed by a host program running on a device to facilitate a control program displaying content in a window in which the host program displays content. As part of an API, a method is exposed that the control program can invoke to pass to the host program a definition of a surface presenter to be created by the host program. Additionally, the control program can store content that the control program desires to have presented in a buffer of the surface presenter, and invoke another method exposed as part of an API to pass to the host program an indication of the content that the control program desires to have displayed in the window in which the host program displays content.

20 Claims, 6 Drawing Sheets

(56) References Cited

U.S. PATENT DOCUMENTS

| | | | |
|---|---|---|---|
| 2005/0088454 A1 | 4/2005 | Lin | |
| 2005/0223127 A1* | 10/2005 | Boutcher et al. | 710/22 |
| 2008/0120626 A1 | 5/2008 | Graffagnino | |
| 2010/0013842 A1 | 1/2010 | Green et al. | |
| 2010/0118038 A1 | 5/2010 | Labour et al. | |
| 2010/0164983 A1 | 7/2010 | Lawrence et al. | |
| 2012/0216217 A1 | 8/2012 | Constable | |

OTHER PUBLICATIONS

"2D graphics API for flight sim avionics displays?", Retrieved from: <http://www.gamedev.net/topic/391704-2d-graphics-api-for-flight-sim-avionics-displays> on Jan. 18, 2011, (May 7, 2006), 3 pages.

"Binary Behaviors", Retrieved from: <http://msdn.microsoft.com/en-us/library/aa753684(VS.85).aspx> on Jan. 18, 2011, 1 page.

"Filters", Retrieved from: <http://msdn.microsoft.com/en-us/library/aa753418(VS.85).aspx> on Jan. 18, 2011, 1 page.

"IDXGISwapChain Interface", http://msdn.microsoft.com/en-us/library/bb174569(VS.85).aspx>>, Retrieved Date: Jan. 27, 2011, 2 Pages.

"Notice of Allowance", U.S. Appl. No. 13/031,954, (Dec. 17, 2012),14 pages.

"OLE and Data Transfer", Retrieved from: <http://msdn.microsoft.com/en-us/library/ms693425(VS.85).aspx> Jan. 18, 2011, 1 page.

"Supported Pixel Formats and Alpha Modes", Retrieved from: <http://msdn.microsoft.com/en-us/library/dd756766(VS.85).aspx#supported_formats_for_dxgi_surface_render_target> on Jan. 18, 2011, (Jul. 8, 2010), 7 pages.

Johnson, Ted "The Architecture of Full Hardware Acceleration of All Web Page Content", Retrieved from: <http://blogs.msdn.com/b/ie/archive/2010/09/10/the-architecture-of-full-hardware-acceleration-of-all-web-page-content.aspx> on Jan. 18, 2010, (Sep. 10, 2010), 38 pages.

Lorenzen, Mathias "The GDI problem, Internet Explorer 9, Macintosh and Windows", Retrieved from: <http://blog.flamefusion.net/2010/03/the-gdi-problem-internet-explorer-9-macintosh-and-windows> on Jan. 18, 2011, (Mar. 17, 2010), 4 pages.

O'Callahan, Robert "Retained Layers", Retrieved from: <http://weblogs.mozillazine.org/roc/archives/2010/07/retained_layers.html> on Jan. 18, 2010, (Jul. 16, 2010), 6 pages.

Olsson, Erik "Exporting 3D Geoinformation from Baggis Database to CityGML", *Masters of Science Thesis in Geoinformatics, TRITA-GIT EX 09-05, Division of Geoinformatics, Royal Institute of Technology*, Available at <http://www.infra.kth.se/geo/publications/theses/EX-0905.pdf>,(Apr. 2009), 84 pages.

Reed, John A., "Developing interactive educational engineering software for the world wide web with java", (Oct. 29, 1997), 12 pages.

* cited by examiner

INTERFACE FOR DISPLAYING CONTENT
SUPPORTING HARDWARE ACCELERATION

RELATED APPLICATIONS

This application is a continuation of U.S. patent application Ser. No. 13/031,954, filed Feb. 22, 2011, entitled "Interface for Displaying Content Supporting Hardware Acceleration", now U.S. Pat. No. 8,424,025, the entire disclosure of which is hereby incorporated by reference herein in its entirety.

BACKGROUND

Extensions, such as ActiveX® controls, can display content in their own window that is displayed over a window displayed by the host program, or in a windowless mode in which the content displayed by the extension is composited with content displayed by the host program. However, when displaying content in a windowless mode, the host program typically begins displaying content on a surface and then provides that surface to the extension. The extension displays its content on that surface, and then returns that surface to the host program. This technique involves significant resource usage and can be time consuming, reducing the performance of the displaying by the extension and the host program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application programming interface (API) is exposed by a host program running on a device. The API facilitates a control program displaying content in a window in which the host program displays content. As part of the API, a method is exposed that the control program can invoke to pass to the host program a definition of a surface presenter to be created by the host program. The surface presenter includes one or more buffers in which the control program can store content to be displayed.

In accordance with one or more aspects, an application programming interface (API) is exposed by a host program running on a computing device. The API facilitates a control program displaying content in a window in which the host program displays content. As part of the API, a method is exposed that the control program can invoke to pass to the host program an indication of content that the control program desires to have displayed in the window in which the host program displays content. This content that the control program desires to have displayed is stored in a buffer of a surface presenter created prior to the control program invoking the method of the API.

BRIEF DESCRIPTION OF THE DRAWINGS

The same numbers are used throughout the drawings to reference like features.

DETAILED DESCRIPTION

An interface for displaying content supporting hardware acceleration is discussed herein. A host program (e.g., a Web browser) exposes an application programming interface (API) that can be invoked by a control program (e.g., an ActiveX® control) to display surfaces. The control program invokes a method of the API to create a surface, and then displays content by invoking a method of the API to present the content to that surface. Passing of the surface back and forth between the host program and the control program need not be performed.

Figure 1:
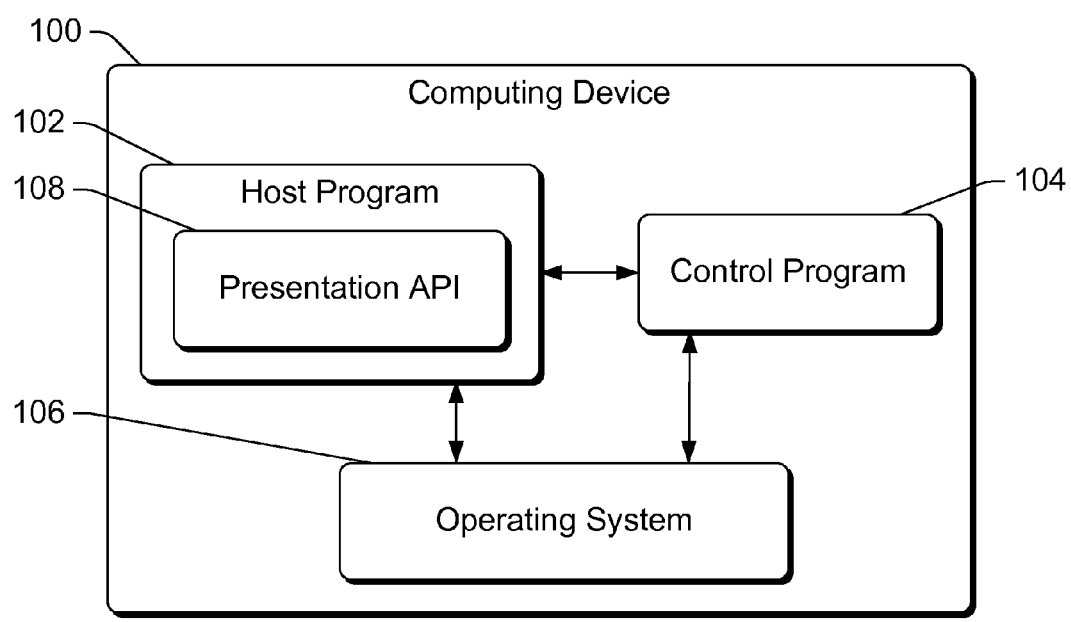
FIG. 1 illustrates an example computing device implementing the interface for displaying content supporting hardware acceleration in accordance with one or more embodiments.

FIG. 1 illustrates an example computing device 100 implementing the interface for displaying content supporting hardware acceleration in accordance with one or more embodiments. Computing device 100 can be a variety of different types of devices. For example, computing device 100 can be a desktop computer, a server computer, a laptop or netbook computer, a tablet or notepad computer, a mobile station, an entertainment appliance, a set-top box communicatively coupled to a display device, an audio/video playback device, a television or other display device, a cellular or other wireless phone, a game console, an automotive computer, and so forth.

Computing device 100 includes a host program 102, a control program 104, and an operating system 106. Although illustrated as separate programs, it should be noted that host program 102 and control program 104 are typically executed or run as part of a single process. Alternatively, host program 102 and control program 104 can be executed or run as separate processes.

Operating system 106 manages execution of programs on computing device 100, including host program 102 and control program 104. Programs 102 and 104 are also referred to as application level programs or modules rather than operating system level programs or modules. In one or more embodiments, host program 102 is a Web browser program that allows users of computing device 100 to access Web sites via a network (such as the Internet, a local area network, a wireless network (e.g., cellular or Wi-Fi), and so forth). However, host program 102 can alternatively be any of a variety of other types of programs, such as an entertainment program (e.g., a game or audio/video playback program), a productivity program (e.g., a word processing or spreadsheet program), a reference program (e.g., a dictionary program), a utility program, and so forth.

Control program 104 is a program that works in conjunction with host program 102. Control program 104 can provide a variety of different functionality or operations to supplement those provided by host program 102. Control program 104 can also generate its own content that is to be displayed in a window in which host program 102 is also displaying content. Host program 102 exposes a presentation API 108 to facilitate control program 104 displaying content in the same window as host program 102.

Although a single host program 102 and a single control program 104 are illustrated in FIG. 1, it should be noted that multiple host programs 102 and/or multiple control programs 104 can be included in computing device 100. For example, multiple control programs 104 can each communicate with one or more host programs 102.

In one or more embodiments, host program 102 is a Web browser program in which content from one or more ActiveX® sites are displayed. Additional information regarding ActiveX® sites, as well as ActiveX® controls, is available from Microsoft Corporation of Redmond, Wash. Each of these ActiveX® sites supports control programs 104 that are ActiveX® controls. These ActiveX® sites display content in one or more windows, and allow the ActiveX® controls to display content within those same windows by invoking methods of presentation API 108.

In other embodiments, rather than being ActiveX® controls, control programs 104 are other types of programs that supplement the functionality or operation of host program 102. Control programs 104 can be a variety of different types of add-ons, plug-ins, extensions, and so forth.

Figure 2:
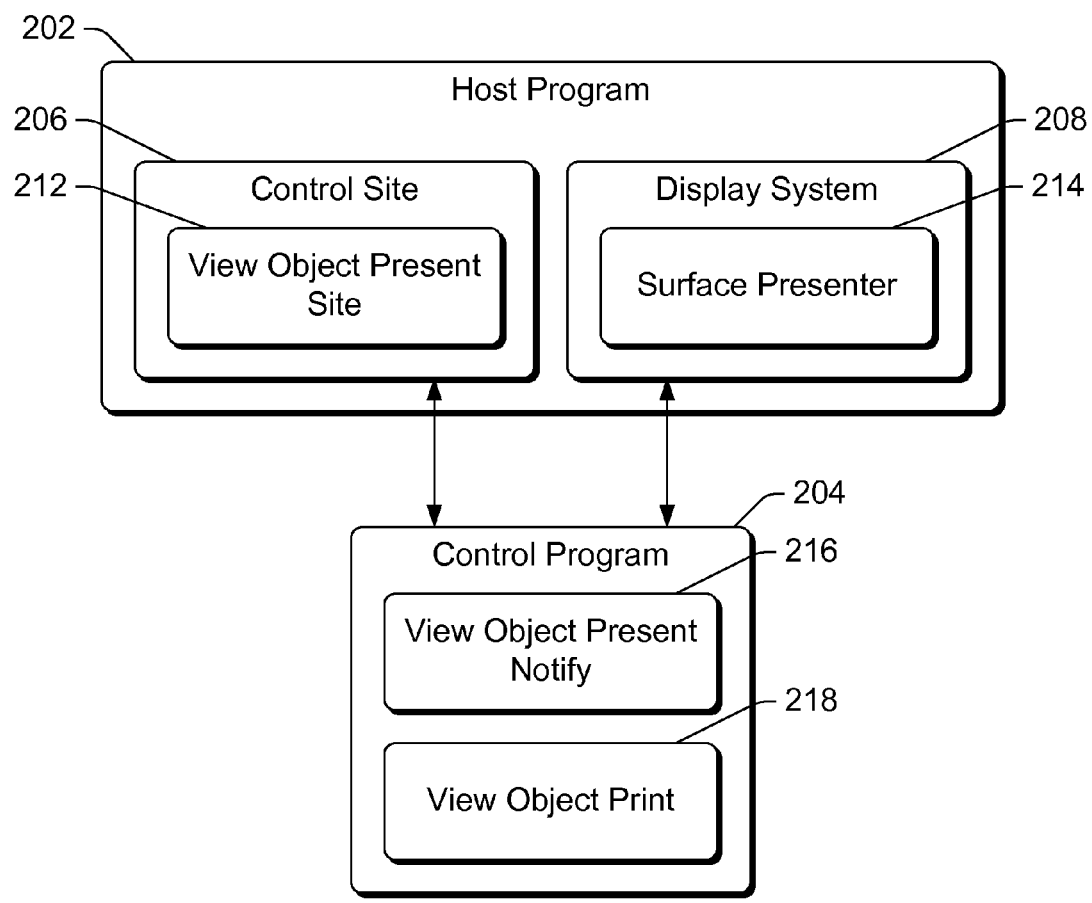
FIG. 2 illustrates an example system implementing the interface for displaying content supporting hardware acceleration in accordance with one or more embodiments.

FIG. 2 illustrates an example system 200 implementing the interface for displaying content supporting hardware acceleration in accordance with one or more embodiments. System 200 includes a host program 202 (which can be a host program 102 of FIG. 1) and a control program 204 (which can be a control program 104 of FIG. 1). Host program 202 includes a control site 206 and a display system 208. Control site 206 is data, instructions, and/or other information that is to be displayed, or that generates content to be displayed, by display system 208. In one or more embodiments, control site 206 is a markup language page (e.g., a Web page), which can be obtained from a variety of different sources such as a server device accessed via a network (e.g., the Internet), a local cache, another component or module of a device implementing system 200, and so forth. Control site 206 provides content to display system 208, which in turn displays the content obtained from control site 206.

Display system 208 operates to render or otherwise display content obtained from control site 206. Display system 208 can expose various APIs, in addition to the APIs discussed herein, that can be invoked by control site 206 or other modules or components of host program 202 to display content. Display system 208 uses hardware accelerated rendering, leveraging one or more graphics processing units (GPUs) or GPU cores available in the device implementing system 200 to display content. The APIs discussed herein allow control program 204 to provide various data or information, including content to be displayed, to control site 206 and display system 208 in a manner that allows display system 208 to use hardware accelerated rendering. In one or more embodiments, display system 208 is implemented using one or more versions of the DirectX® technology or Direct3D® technology. Additional information regarding the DirectX® technology and the Direct3D® technology is available from Microsoft Corporation of Redmond, Wash.

Control site 206 and display system 208 present one or more APIs allowing control program 204 to display content in the same window in which control site 206 is displaying content. Control program 204 typically displays content in a portion of the window in which control site 206 is displaying content, but can alternatively display content in the entire window in which control site 206 is displaying content. Control program 204 displaying content in the same window in which control site 206 is displaying content is also referred to as control program 204 displaying content in a windowless mode. These APIs presented by control site 206 and display system 208 can be part of presentation API 108 of FIG. 1. To display content in a window of control site 206, control program 204 defines a surface (e.g., one or more rectangles or other two-dimensional geometric shapes) that is created by control site 206 (or display system 208), and control program 204 then presents to that surface the content to be displayed. Control program 204 can change the content to be displayed by changing the content presented to that surface.

In one or more embodiments, display system 208 displays content based on D3D devices. A D3D device refers to an object that is an abstraction of the video hardware (e.g., graphics card or device) that display system 208 uses for displaying content. Control program 204 generates its own D3D device for the video hardware and defines a surface presenter associated with that D3D device. The surface presenter (also referred to as a surface) is a collection of one or more buffers, each buffer being a two-dimensional buffer (a rectangle or other two-dimensional shape) for graphics displaying. Control program 204 passes an indication of the D3D device and the definition of the surface presenter to control site 206. Control site 206 (or alternatively display system 208) in turn creates one or more buffers, as defined by control program 204, in a memory of the device implementing system 200 (e.g., in system memory or video memory). Creation of a buffer refers to establishing a buffer having a particular dimension (e.g., width and height) in which content to be displayed can be stored. These one or more buffers created by control site 206 are accessible to control program 204 (allowing control program 204 to store content to be displayed in the buffers) as well as control site 206 and/or display system 208 (allowing display system 208 to display the content in the buffers). Control site 206 exposes a view object interface, referred to as "View Object Present Site" API 212, that control program 204 invokes to pass the indication of the D3D device that control program 204 created and the definition of the surface presenter to control site 206.

Control site 206 passes or otherwise communicates an indication of the D3D device that control program 204 created, as well as the buffers that control site 206 created, to display system 208. Alternatively, control site 206 can pass or otherwise communicate the definition of the surface presenter to display system 208, and display system 208 can create the buffers. Display system 208 exposes a surface presentation interface, referred to as "Surface Presenter" API 214, that control program 204 invokes to pass content to be displayed by display system 208. Control program 204 stores the content to be displayed in a buffer of the surface presenter, and provides an indication of that buffer (and optionally an indication of a particular portion of that buffer that includes the content to be displayed) to display system 208. Display system 208 draws a frame for display by compositing or otherwise combining the content received from control site 206 and the content received from control program 204, and providing the combined content to the video hardware for display or rendering. Display system 208 can composite or otherwise combine the content received from control site 206 and the content received from control program 204 in any of a variety of conventional manners. Host program 202 (e.g., control site 206 and/or display system 208) creates its own D3D device for displaying content generated by control site 206, which is separate from the D3D device created by control program 204.

It should be noted that, as control program 204 generates its own D3D device, the D3D device used by control site 206 need not be (and typically is not) communicated to control program 204. Thus, content being displayed by control site 206 need not be revealed to (and thus would not be changeable by) control program 204.

It should also be noted that although specific techniques and APIs for control program 204 to display content in a same window as control site 206 is displaying content are discussed herein, other techniques for displaying content can be supported by host program 202. Thus, control program 204 need not implement the techniques discussed herein to display content, but rather employ other well-known and/or proprietary techniques for displaying content.

In one or more embodiments, control program 204 also exposes one or more APIs to host program 202. These APIs include a displaying notification interface, referred to as "View Object Present Notify" API 216, and/or a print notification interface, referred to as "View Object Print" API 218. The View Object Present Notify API 216 notifies control program 204 that control site 206 is about to start displaying content. Control program 204 can use this notification to display its own content, and thus have changes to content being displayed by control program 204 synchronized with content being displayed by control site 206. The View Object Print API 218 notifies control program 204 that control site 206 is about to be printed (e.g., a hard copy generated or the content being displayed otherwise printed to a printing device or component). Control program 204 can use this notification to provide control site 206 with a higher resolution version of the content being presented by control program 204 so that the higher resolution version of the content is used for printing.

Specific examples of APIs exposed by host program 202 and control program 204 are included in the following. It should be noted that these APIs are examples, and that other nomenclature, parameters, and so forth can alternatively be used.

The "View Object Present Site" API 212 is exposed by control site 206 of host program 202 and includes three methods: a "CreateSurfacePresenter" method, an "IsHardwareComposition" method, and a "SetCompositionMode" method. An example implementation of the "View Object Present Site" API 212 is included in Table I.

The "CreateSurfacePresenter" method at lines 3-6 allows control program 204 to pass to control site 206 a definition of a surface presenter. The "CreateSurfacePresenter" method includes multiple parameters (provided by control program 204) for passing this definition to control site 206. These parameters include a device parameter ("pDevice") identifying the D3D device associated with the surface presenter (and created by control program 204). These parameters also include a width parameter ("width") and a height parameter ("height") indicating a width and height for each of the buffers that are part of the surface presenter. These parameters also include a buffer count parameter ("backBufferCount") identifying a number of buffers that are included in the surface presenter.

The parameters of the "CreateSurfacePresenter" method also include a format parameter ("format") identifying the format for the buffers that are included in the surface presenter. Different buffer formats are supported by display system 208, and the format parameter identifies a specific one of those buffer formats. The parameters of the "CreateSurfacePresenter" method also include a mode parameter ("mode") identifying to control site 206 how to interpret the alpha channel of the buffers that are included in the surface presenter. The alpha channel mode is used by display system 208 in determining how to display the content being displayed by control program 204 and control site 206.

The "CreateSurfacePresenter" method returns a value ("ppQueue") that identifies a surface presenter API (e.g., "Surface Presenter" API 214) that control program 204 can invoke. The surface presenter API includes various methods, as discussed in more detail below.

The "IsHardwareComposition" method at lines 7-8 allows the control to query control site 206 as to whether host program 202 (and thus also control site 206) is using hardware acceleration to do displaying and/or compositing for display. The "IsHardwareComposition" method returns a Boolean value indicating whether host program 202 is using hardware acceleration. Control program 204 can use this indication to determine whether control program 204 is to use (or create) a surface presenter (and also use the surface presenter API) and whether control program 204 is to create a D3D device, or whether control program 204 is to use other techniques in communicating content for display by display system 208.

The "SetCompositionMode" method at lines 9-10 allows control program 204 to indicate to host program 202 whether control program 204 desires to provide content to display system 208 using the created surface presenter technique (and the surface presenter API) or using another technique. Thus, even if host program 202 is using hardware acceleration, control program 204 can choose to use a different technique for communicating content for display by display system 208. The "SetCompositionMode" method includes a mode param-

TABLE I

| Line | Interface |
|---|---|
| 1 | interface IViewObjectPresentSite : IUnknown |
| 2 | { |
| 3 | [ ] HRESULT CreateSurfacePresenter([in] IUnknown* pDevice,[in] UINT |
| 4 | width,[in] UINT height,[in] UINT backBufferCount,[in] DXGI_FORMAT |
| 5 | format,[in] VIEW_OBJECT_ALPHA_MODE mode,[retval, out] |
| 6 | ISurfacePresenter** ppQueue); |
| 7 | [ ] HRESULT IsHardwareComposition([retval, out] BOOL* |
| 8 | pIsHardwareComposition); |
| 9 | [ ] HRESULT SetCompositionMode([in] |
| 10 | VIEW_OBJECT_COMPOSITION_MODE mode); |
| 11 | }; | eter ("mode") that is provided by control program 204 identifying whether control program 204 desires to provide content to display system 208 using the created surface presenter technique or using another technique.

The "View Object Present Site" API 212 can also optionally include an additional request frame method. Alternatively, an additional API can be exposed by control site 206 that includes the methods of the "View Object Present Site" API 212 as well as the request frame method. An example of the request frame method is "[ ] HRESULT RequestFrame( )". The request frame method includes no parameters, and is invoked by control program 204 to request that host program 202 draw another frame. It should be noted that the request frame method does not mark any region of a frame or window as being invalid or as needing re-drawing (updated for displaying); rather the request frame method simply requests that the window or frame be drawn (displayed) again. Control program 204 can invoke the request frame method in different situations, such as when control program 204 is displaying changes very quickly and desires host program 202 to display new frames quickly (and essentially keep up with or be synchronized with control program 204). Control program 204 can invoke the request frame method prior to presenting new content for display, or after presenting new content for display.

The "Surface Presenter" API 214 is exposed by display system 208 of host program 202 and includes three methods: a "Present" method, a "GetBuffer" method, and an "IsCurrent" method. An example implementation of the "Surface Presenter" API 214 is included in Table II.

TABLE II

| Line | Interface |
|---|---|
| 1 | interface ISurfacePresenter : IUnknown |
| 2 | { |
| 3 |   [ ] HRESULT Present([in] UINT uBuffer, [in] RECT* pDirty); |
| 4 |   [ ] HRESULT GetBuffer([in] UINT backBufferIndex,[in] |
| 5 |   REFIID riid,[retval, out, iid_is(riid)] void** ppBuffer); |
| 6 |   [ ] HRESULT IsCurrent([retval, out] BOOL* pIsCurrent); |
| 7 | }; |

The "Present" method at line 3 allows control program 204 to pass to display system 208 an indication of content that control program 204 desires to have displayed by display system 208. The "Present" method includes multiple parameters (provided by control program 204) for providing this indication to display system 208. These parameters include a buffer parameter ("uBuffer") identifying one of the buffers included in the surface presenter to which control program 204 has saved the content that control program 204 desires to have displayed. In one or more embodiments, the buffers included in the surface presenter are maintained as an array, and the buffer parameter is an index into that array of buffers. These parameters also include an area parameter ("pDirty") identifying an area of the buffer from which display system 208 is to obtain the content to be displayed. The area of the buffer is typically a rectangle, although other geometric shapes can alternatively be used.

In response to the "Present" method being invoked, display system 208 copies the content from the identified area of the identified buffer to a buffer of the D3D device created by display system 208 and composites or otherwise combines that content with the content from control site 206 for display. The surface presenter can (and typically does) include multiple buffers. Control program 204 can store content to be displayed in multiple ones of these buffers, but display system 208 does not display the content in a particular buffer until control program 204 invokes the "Present" method identifying that particular buffer. One of the buffers (referred to as a front buffer) is the buffer from which display system 208 obtains the content to be displayed in response to the "Present" method being invoked, and the other buffers are referred to as back buffers. Display system 208 can maintain these buffers in different manners, such as making the buffer identified in the "Present" method the front buffer and copying the data from the front buffer to a buffer of the D3D device created by display system 208, copying the content from the buffer identified in the "Present" method to a different buffer that is the front buffer and then copying the data from the front buffer to a buffer of the D3D device created by display system 208, and so forth.

Display system 208 continues to display the content that was last presented by control program 204 (by invoking the "Present" method) each time the window or a frame is re-drawn. E.g., each time display system 208 composites or otherwise combines the content presented by control program 204 with the content from control site 206 for display, display system 208 uses the content that was last provided by the control program 204 by invoking the "Present" method. Display system 208 need not request content or input from control program 204 each time the window or frame is re-drawn; rather, display system 208 simply uses the content that was last provided by control program 204.

The "GetBuffer" method at lines 4-5 allows control program 204 to obtain a pointer to a particular buffer in the surface presenter. Control program 204 defines the number of buffers to be created, but the buffers are created by control site 206 (or display system 208). The "GetBuffer" method is invoked by control program 204 to obtain a pointer or other identifier of a particular one of the buffers that were created, allowing control program 204 to store content to be displayed in that buffer. The "GetBuffer" method includes a buffer parameter ("buffer"), provided by control program 204, identifying one of the buffers (e.g., by index value) included in the surface presenter to which control program 204 desires a pointer. The "GetBuffer" method also includes an id parameter ("riid"), provided by control program 204, identifying a type of interface (e.g., a type of component object model (COM) interface) that is to be returned by the "GetBuffer" method. The "GetBuffer" method returns a value ("ppBuffer") that is the pointer to the buffer requested by control program 204.

In one or more embodiments, the locations of the buffers created by control site 206 (or display system 208) can change over time. Accordingly, in such embodiments control program 204 typically invokes the "GetBuffer" method prior to storing content to be displayed in a buffer to ensure that control program 204 is storing the content in the correct location.

The "IsCurrent" method at line 6 allows control program 204 to query host program 202 as to whether the D3D device used to create the surface presenter (the one or more buffers previously defined by control program 204) is still the current D3D device that host program 202 is using for display (e.g., whether the surface presenter is still usable to display content). The "IsCurrent" method returns a Boolean value indicating whether the D3D device used to create the surface presenter is still the current device that host program 202 is using for display. Control program 204 can use this indication to determine whether control program 204 is to create a new surface presenter. For example, control program 204 can create a new surface presenter if the D3D device previously used to create the surface presenter is not still the current device that host program 202 is using for display, and can use the previously created surface presenter if the D3D device is still the current device that host program 202 is using for display.

The "View Object Print" API 218 is exposed by control program 204 and includes a "GetPrintBitmap" method. An example implementation of the "View Object Print" API 218 is included in Table III.

TABLE III

| Line | Interface |
|------|-----------|
| 1 | interface IViewObjectPrint : IUnknown |
| 2 | { |
| 3 | [ ] HRESULT GetPrintBitmap([retval, out] IUnknown **ppPrintBitmap); |
| 4 | }; |

The "GetPrintBitmap" method at line 3 allows control site 206 to notify control program 204 that the content being displayed is about to be printed (e.g., that the printing process has been initiated, or that the content will be printed within a certain amount of time). The "GetPrintBitmap" method returns a bitmap (or alternatively another data structure) that is a version of the content being displayed by control program 204 that is to be printed. Control program 204 can provide control site 206 with a different version of the content being displayed by control program 204 (e.g., a higher resolution version of the content being displayed). Control program 204 can provide, for return to control site 206, a version of the content of any size and/or resolution desired by control program 204.

If no such bitmap is returned by control program 204, or control program 204 does not expose "View Object Print" API 218, then the content last presented by control program 204 (using the "Present" method of the "Surface Presenter" API 214 discussed above) is the content that is printed. Additionally, in one or more embodiments control program 204 can return, in response to the "GetPrintBitmap" method being invoked, an indication that the content last presented by control program 204 is the content to be printed.

The "View Object Present Notify" API 216 is exposed by control program 204 and includes an "OnPreRender" method. An example implementation of the "View Object Present Notify" API 216 is included in Table IV.

TABLE IV

| Line | Interface |
|------|-----------|
| 1 | interface IViewObjectPresentNotify : IUnknown |
| 2 | { |
| 3 | [ ] HRESULT OnPreRender( ); |
| 4 | }; |

The "OnPreRender" method at line 3 allows control site 206 to notify control program 204 that control site 206 is about to start displaying content (e.g., that the displaying process has been initiated, or that the content will be displayed within a certain amount of time). Control program 204 can use this notification to display its own content (using the "Present" method of the "Surface Presenter" API 214 discussed above), and thus have content displayed by control program 204 be synchronized with content displayed by control site 206. Similarly, an "OnPostRender" method can be exposed by control program 204 that is analogous to the "OnPreRender" method except that the "OnPostRender" allows control site 206 to notify control program 204 that control site 206 has just displayed new content (using the "Present" method of the "Surface Presenter" API 214 discussed above).

Figure 3:
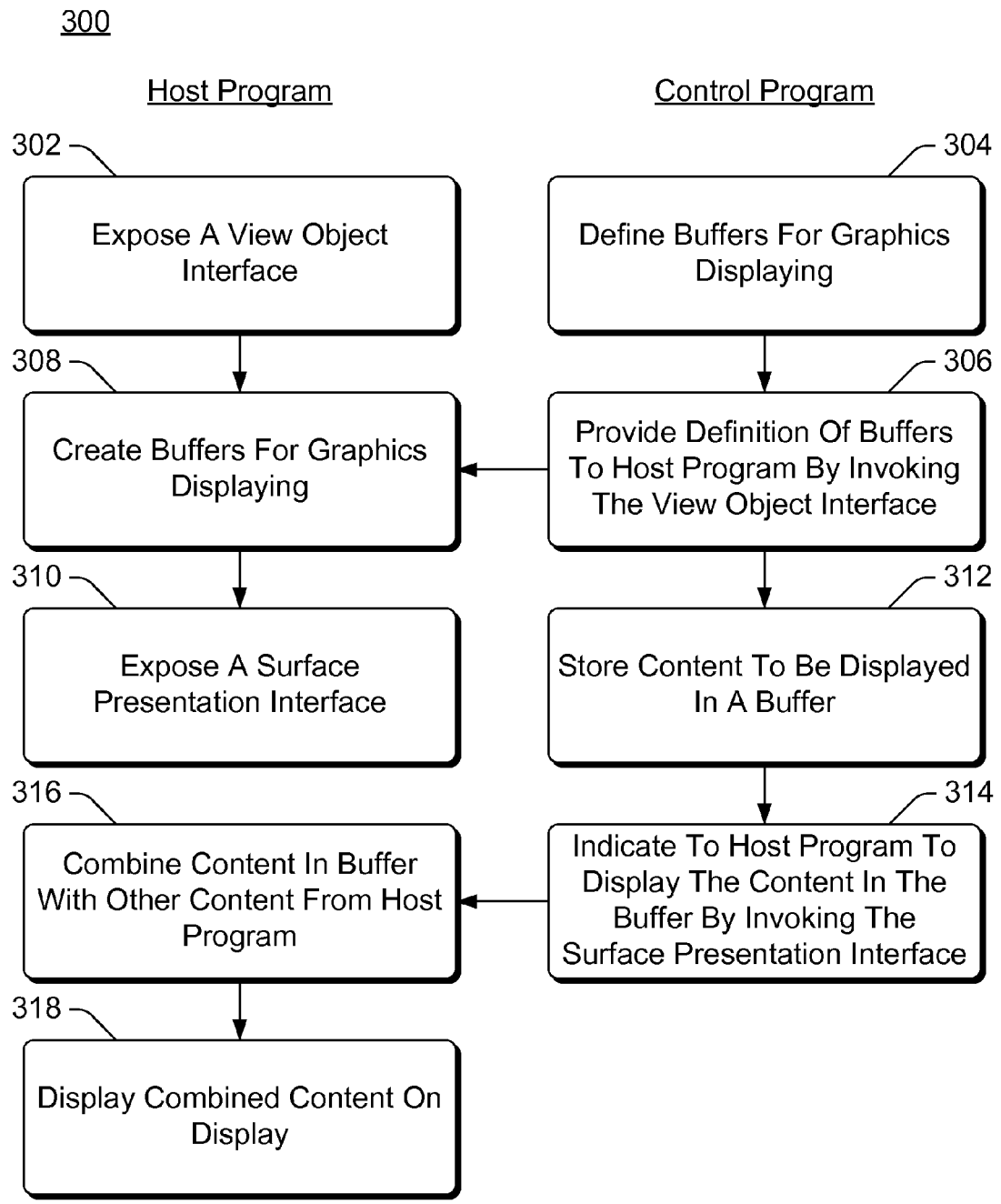
FIG. 3 is a flowchart illustrating an example process for implementing and using an interface for displaying content supporting hardware acceleration in accordance with one or more embodiments.

FIG. 3 is a flowchart illustrating an example process 300 for implementing and using an interface for displaying content supporting hardware acceleration in accordance with one or more embodiments. Process 300 can be implemented in software, firmware, hardware, or combinations thereof. Acts of process 300 illustrated on the left-hand side of FIG. 3 are carried out by a host program, such as host program 202 of FIG. 2. Acts of process 300 illustrated on the right-hand side of FIG. 3 are carried out by a control program, such as control program 204 of FIG. 2. Process 300 is shown as a set of acts and is not limited to the order shown for performing the operations of the various acts. Process 300 is an example process for implementing and using an interface for displaying content supporting hardware acceleration; additional discussions of implementing and using an interface for displaying content supporting hardware acceleration are included herein with reference to different figures.

In process 300, the host program exposes a view object interface (act 302). The view object interface can be, for example, "View Object Present Site" API 212 of FIG. 2.

Additionally, the control program defines one or more buffers for graphics displaying (act 304), and provides an indication of the buffers defined in act 304 to the host program by invoking the view object interface (act 306). These one or more buffers are included as part of a surface presenter as discussed above, and the indication can be passed by invoking, for example, a "CreateSurfacePresenter" method exposed by the view object interface as discussed above.

The host program creates the buffers for graphics displaying (act 308). The buffers are created as defined by the control program.

The host program also exposes a surface presentation interface (act 310), allowing the control program to present content to be displayed to the host program. The surface presentation interface can be, for example, the "Surface Presenter" API 214 of FIG. 2.

The control program stores, in one of the buffers created in act 308, content to be displayed in a portion of a window in which the host program also displays content (act 312). The control program indicates to the host program to display the content in the buffer by invoking the surface presentation interface (act 314). The indication of the content can be passed to the host program by invoking, for example, a "Present" method exposed by the surface presentation interface as discussed above.

The host program combines the content in the buffer (from the control program) with other content from the host program (act 316), and displays the combined content on the display (act 318). The content can be composited or otherwise combined as discussed above.

Figure 4:
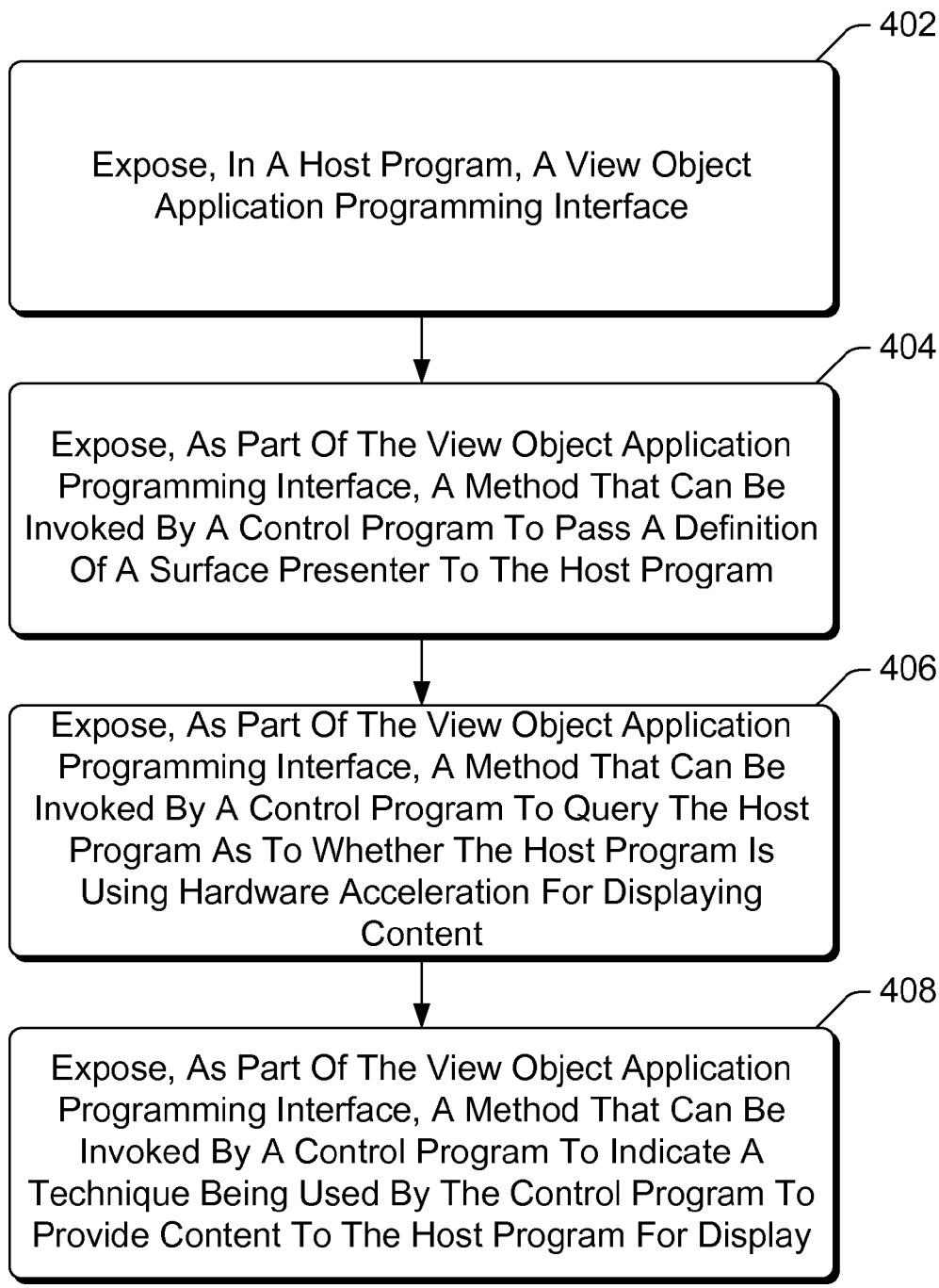
FIG. 4 is a flowchart illustrating an example process for exposing an interface that facilitates a control program displaying content in a portion of a window in which the host program displays content in accordance with one or more embodiments.

FIG. 4 is a flowchart illustrating an example process 400 for exposing an interface that facilitates a control program displaying content in a portion of a window in which the host program displays content in accordance with one or more embodiments. Process 400 is carried out by a host program, such as host program 202 of FIG. 2, and can be implemented in software, firmware, hardware, or combinations thereof. Process 400 is shown as a set of acts and is not limited to the order shown for performing the operations of the various acts. Process 400 is an example process for exposing an interface that facilitates a control program displaying content in a portion of a window in which the host program displays content; additional discussions of exposing an interface that facilitates a control program displaying content in a portion of a window in which the host program displays content are included herein with reference to different figures.

In process 400, a view object application programming interface is exposed (act 402). The view object application programming interface can be, for example, a "View Object Present Site" API 212 of FIG. 2 as discussed above.

As part of the view object application programming interface, a method that can be invoked by a control program to pass a definition of a surface presenter to the host program is exposed (act 404). The surface presenter includes one or more buffers for graphics displaying as discussed above. The method exposed in act 404 can be, for example, a "CreateSurfacePresenter" method as discussed above.

Also as part of the view object application programming interface, a method that can be invoked by a control program to query the host program as to whether the host program is using hardware acceleration for displaying content is exposed (act 406). The method exposed in act 406 can be, for example, an "IsHardwareComposition" method as discussed above.

Also as part of the view object application programming interface, a method that can be invoked by a control program to indicate a technique being used by the control program to provide content to the host program for display is exposed (act 408). This indication can be an indication of whether the control program desires to provide content to the host program using the created surface presenter technique or using another technique. The method exposed in act 408 can be, for example, a "SetCompositionMode" method as discussed above.

Figure 5:
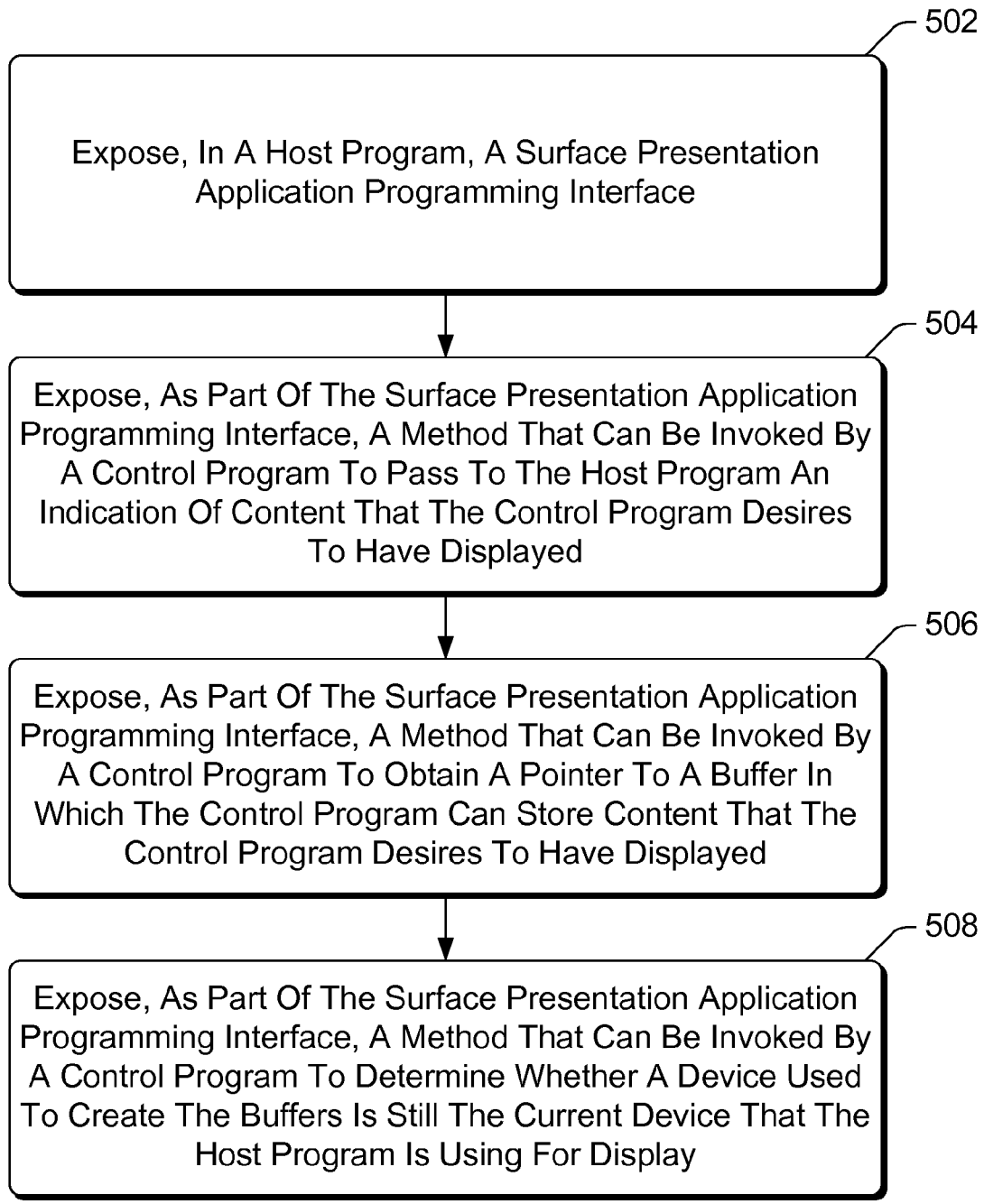
FIG. 5 is a flowchart illustrating another example process for exposing an interface that facilitates a control program displaying content in a portion of a window in which the host program displays content in accordance with one or more embodiments.

FIG. 5 is a flowchart illustrating another example process 500 for exposing an interface that facilitates a control program displaying content in a portion of a window in which the host program displays content in accordance with one or more embodiments. Process 500 is carried out by a host program, such as host program 202 of FIG. 2, and can be implemented in software, firmware, hardware, or combinations thereof. Process 500 is shown as a set of acts and is not limited to the order shown for performing the operations of the various acts. Process 500 is an example process for exposing an interface that facilitates a control program displaying content in a portion of a window in which the host program displays content; additional discussions of exposing an interface that facilitates a control program displaying content in a portion of a window in which the host program displays content are included herein with reference to different figures.

In process 500, a surface presentation application programming interface is exposed (act 502). The surface presentation application programming interface can be, for example, a "Surface Presenter" API 214 of FIG. 2 as discussed above.

As part of the surface presentation application programming interface, a method that can be invoked by a control program to pass to the host program an indication of content that the control program desires to have displayed is exposed (act 504). The method exposed in act 504 can be, for example, a "Present" method as discussed above.

Also as part of the surface presentation application programming interface, a method that can be invoked by a control program to obtain a pointer to a buffer in which the control program can store content that the control program desires to have displayed is exposed (act 506). The method exposed in act 506 can be, for example, a "GetBuffer" method as discussed above.

Also as part of the surface presentation application programming interface, a method that can be invoked by a control program to determine whether a device used to create the buffers is still the current device that the host program is using for display is exposed (act 508). These buffers are the buffers via which the control program passes to the host program content that the control program desires to have displayed. The method exposed in act 508 can be, for example, an "IsCurrent" method as discussed above.

Figure 6:
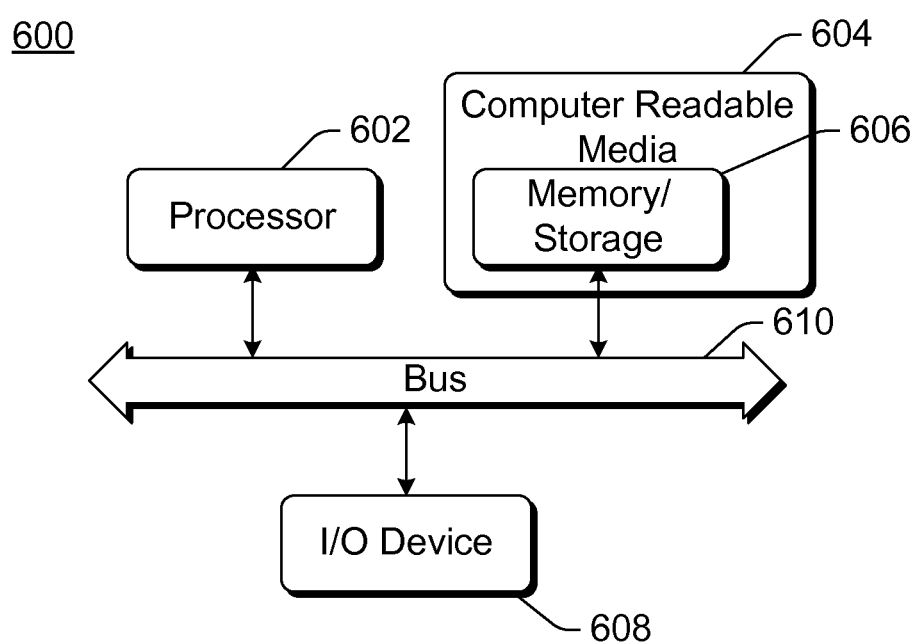
FIG. 6 illustrates an example computing device that can be configured to implement the interface for displaying content supporting hardware acceleration in accordance with one or more embodiments.

FIG. 6 illustrates an example computing device 600 that can be configured to implement the interface for displaying content supporting hardware acceleration in accordance with one or more embodiments. Computing device 600 can be, for example, computing device 100 of FIG. 1, and/or can implement system 200 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the interface for displaying content supporting hardware acceleration techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a device, the method comprising:
    exposing, by a host program running on the device, a first application programming interface (API) to facilitate a control program, running on the device, displaying content in a window in which the host program displays content;
    exposing, as part of the first API, a first method that the control program can invoke to pass to the host program a definition of a surface presenter to be created by the host program, the surface presenter including one or more buffers in which the control program can store content to be displayed;
    exposing, as part of the first API, a second method that the control program can invoke to determine whether the host program is using hardware acceleration for displaying the content;
    combining, by the host program, the content in the one or more buffers stored by the control program and other content from the host program; and
    displaying, by the host program, the combined content.

2. A method as recited in claim 1, wherein the host program comprises a Web browser, and the control program comprises an ActiveX® control.

3. A method as recited in claim 1, further comprising exposing, as part of the first API, a third method that the control program can invoke to notify the host program whether the control program desires to provide content for displaying to the host program by invoking the first method.

4. A method as recited in claim 1, further comprising:
    exposing, by the host program, a second API to facilitate the control program displaying content in the window in which the host program displays content; and
    exposing, as part of the second API, a third method that the control program can invoke to pass to the host program an indication of content that the control program desires to have displayed in the window in which the host program displays content.

5. A method as recited in claim 4, further comprising exposing, as part of the second API, a fourth method that can be invoked by the control program to obtain a pointer to one of the one or more buffers in which the control program can store the content that the control program desires to have displayed.

6. A method as recited in claim 5, further comprising exposing, as part of the second API, a fifth method that can be invoked by the control program to determine whether a device used to create the surface presenter is still the current device that the host program is using for display.

7. A method as recited in claim 4, further comprising invoking a method of a third API, exposed by the control program, to notify the control program that the host program is about to print the content being displayed to a printer.

8. A method as recited in claim 7, further comprising receiving from the control program, in response to invoking the method of the third API, a bitmap that is a version of the content being displayed by the control program that is to be printed to the printer.

9. A method as recited in claim 4, the displaying including displaying the content in a portion of the window or in the entire window in which the host program displays content.

10. A method as recited in claim 1, further comprising invoking a method of a second API, exposed by the control program, to notify the control program that the host program is about to start displaying content.

11. A method as recited in claim 1, further comprising exposing, as part of the first API, a third method that the control program can invoke to request that the host program draw another frame.

12. A method in a device, the method comprising:
    invoking, by a control program on the device, a first application programming interface (API) method exposed by a host program running on the device to pass to the host program a definition of a surface presenter to be created by the host program;
    invoking, by the control program, a second API method exposed by the host program to pass to the host program an indication of content that the control program desires to have displayed in a portion of a window in which the host program displays content, the host program combining the content stored in one or more buffers by the control program and other content from the host program, and the host program displaying the combined content; and
    invoking, by the control program, a third API method exposed by the host program to determine whether the host program is using hardware acceleration for displaying the content.

13. A method as recited in claim 12, wherein the host program comprises a Web browser, and the control program comprises an ActiveX® control.

14. A method as recited in claim 12, further comprising invoking, by the control program, a fourth API method exposed by the host program to notify the host program that the control program desires to provide content for displaying to the host program by invoking the first API method.

15. A method as recited in claim 12, further comprising invoking, by the control program, a fourth API method exposed by the host program to obtain a pointer to one of multiple buffers in which the control program can store the content that the control program desires to have displayed.

16. A method as recited in claim 12, further comprising invoking, by the control program, a fourth API method exposed by the host program to determine whether a device used to create the surface presenter is still the current device that the host program is using for display.

17. A method as recited in claim 12, further comprising exposing a fourth API method that can be invoked by the host program to notify the control program that the host program is about to print the content being displayed to a printer.

18. A method as recited in claim 17, further comprising returning, in response to the host program invoking the fourth API method, a bitmap that is a version of the content being displayed by the control program that is to be printed to the printer.

19. A method as recited in claim 12, further comprising invoking, by the control program, a fourth API method exposed by the host program to request that the host program draw another frame.

20. A device comprising:

one or more processors; and one or more computer-readable media having stored thereon multiple instructions that, when executed by the one or more processors, cause the one or more processors to perform acts comprising:

- exposing, by a host program running on the device, a first application programming interface (API) to facilitate a control program displaying content in a window in which the host program displays content;

- exposing, as part of the first API, a first method that the control program can invoke to pass to the host program a definition of a surface presenter to be created by the host program, the surface presenter including one or more buffers in which the control program can store content to be displayed; and

- exposing, as part of the first API, a second method that the control program can invoke to determine whether the host program is using hardware acceleration for displaying the content;

- combining, by the host program, the content in the one or more buffers stored by the control program and other content from the host program; and

- displaying, by the host program, the combined content.

* * * * *